(No Model.)
C. M. STEVENS.
THILL COUPLING.
No. 524,873.  Patented Aug. 21, 1894.
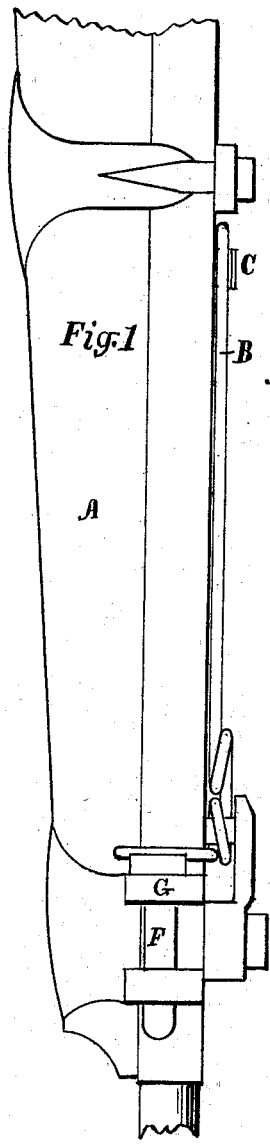
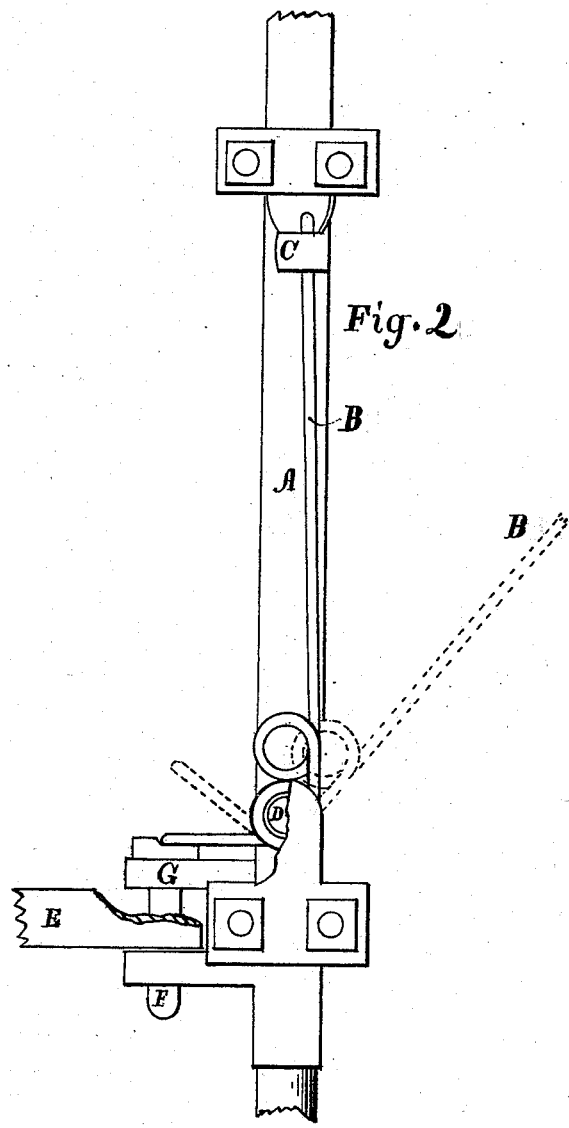
WITNESSES,
E. B. Patterson
S. A. Patterson
C. M. Stevens INVENTOR.
By C. R. Patterson
ATTORNEY.

UNITED STATES PATENT OFFICE.

CORNELIUS M. STEVENS, OF PITTSTON, PENNSYLVANIA.

THILL-COUPLING.

SPECIFICATION forming part of Letters Patent No. 524,873, dated August 21, 1894.

Application filed January 29, 1894. Serial No. 498,342. (No model.)

*To all whom it may concern:*

Be it known that I, CORNELIUS M. STEVENS, a citizen of the United States, residing at Pittston, in the county of Luzerne and State of Pennsylvania, have invented certain new and useful Improvements in Thill-Couplings; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to thill couplings and consists of the following. A spring-lever hung on a pivot or bolt under the axle or thill and bent at nearly a right angle to carry it out from under the axle, then bent upward to the proper position to bear against the bolt, thus holding it in place without the use of a nut; thereby admitting of almost instantaneous coupling and uncoupling of the thills or tongue to or from the vehicle; also in the insertion of a washer I, on the bolt between the head or shoulder of the bolt and the thill butt, to prevent its rattling.

The following is a full and clear description of the same, reference being had to the accompanying drawings and the letters of reference marked thereon.

Figure 1 is a front view of the axle, showing shaft-box and spring. Fig. 2 is a view of the under side of the axle, showing the spring, shaft-box and shaft-butt.

Like letters in the both figures refer to the same parts.

A represents the axle of the vehicle.
B represents the spring-lever.
C represents a hook fastened to the second clip or to the axle, to hold the spring lever in place while the other end presses against the bolt.
D represents the pivot on which the spring lever turns.
E represents the thill-butt partly broken out to show the bolt.
F represents the bolt.
G represents the shaft-box.

It will be readily seen that the spring lever B, which is made so that the short arm of the lever bears against the bolt head, while the long arm is hooked at C, thus bringing the full pressure of the spring upon the bolt and holding it firmly in place.

To couple the thills or tongue to the vehicle, place the thill butt E, in the box G, and the bolt in position and bring the long end of the lever B, over the hook C, and the coupling is secure. To uncouple, unhook the spring lever B, from the hook C, and throw the lever back as indicated by the dotted lines, when the bolt can be removed.

Having thus fully described my invention, what I claim as new, and desire to secure by Letters Patent, is—

The spring lever B, hung under the axle A, on the pivot D, with one end of the spring lever bent up in such a manner as to press against the head of the bolt H, in combination with the hook C, substantially as and for the purpose herein set forth and described.

In testimony whereof I affix my signature in presence of two witnesses.

CORNELIUS M. STEVENS.

Witnesses:
 WALTER KYTE,
 F. H. KYTE.